US006925057B2

(12) United States Patent
Cheng et al.

(10) Patent No.: US 6,925,057 B2
(45) Date of Patent: Aug. 2, 2005

(54) METHOD OF SCHEDULING A QUALITY OF SERVICE LEVEL IN A HIGH DATA RATE SYSTEM

(75) Inventors: Terry Si-Fong Cheng, Singapore (SG); Frances Jiang, Whippany, NJ (US); Stanley Vitebsky, Parsippany, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 815 days.

(21) Appl. No.: 09/731,213

(22) Filed: Dec. 6, 2000

(65) Prior Publication Data

US 2002/0067694 A1 Jun. 6, 2002

(51) Int. Cl.⁷ .............................................. G01R 31/08
(52) U.S. Cl. ....................... 370/235; 370/333; 370/253; 455/452.2; 455/512
(58) Field of Search ................................ 370/329, 412, 370/468, 252–253, 229–236, 310.2, 333, 395.4; 455/452.2, 512

(56) References Cited

U.S. PATENT DOCUMENTS

| | | | | |
|---|---|---|---|---|
| 5,684,791 A | * | 11/1997 | Raychaudhuri et al. | 370/310.2 |
| 5,982,748 A | * | 11/1999 | Yin et al. | 370/232 |
| 6,047,000 A | | 4/2000 | Tsang et al. | 370/412 |

FOREIGN PATENT DOCUMENTS

WO      WO 00/62457      10/2000

OTHER PUBLICATIONS

N. Huang et al., "Efficient Traffic Scheduling Architecture and Policy for Interconnected ATM/Wireless Networks", *IEEE Globecom 1998*, vol. 4, Nov. 8, 1998, pp. 2258–2263.

Q. Pang et al., "Service Scheduling for General Packet Radio Service Classes", *Wireless Communications and Networking Conference, IEEE*, Sep. 1999, pp. 1229–1233.

European Search Report.

CDMA Forward Link Waterfilling Power Control, by J. M. Holtzman, qualcomm, Inc. pp. 1663–1667, !–7803–5718–3/00/$10.00c2000IEEE, VTC2000.

* cited by examiner

*Primary Examiner*—Phirin Sam
*Assistant Examiner*—Robert W. Wilson

(57) ABSTRACT

The present invention is a method for selectively providing, on demand, a Quality of Service level to an end user's data transmitted from a base station to a mobile station of a High Data Rate system. In the disclosed method, a data base is established which contains the Quality of Service level selected by a mobile user from a plurality of levels for data to be transmitted from the base station to the mobile station. Using the reverse link, an end user at a mobile notifies the base station that it is ready to receive data and specifies the rate at which the data is to be sent. Upon receipt of the request for data from the mobile terminal, the base station accesses and runs a scheduler which determines which user's data is to be transmitted next. For each end user, the scheduler divides the requested data rate by the average rate of data received by the mobile during a specific interval and then combines by adding or multiplying the result with the Quality of Service level requested by the end user for data. The end user that has the greatest final result is normally selected to next receive data. The scheduler then conditions the base station to transmit data to the identified mobile station at the requested rate and selected Quality of Service level.

22 Claims, 1 Drawing Sheet

METHOD OF SCHEDULING A QUALITY OF SERVICE LEVEL IN A HIGH DATA RATE SYSTEM

BACKGROUND OF THE INVENTION

1. Field of the Invention

This invention relates generally to mobile telephone systems and, more particularly, to a method of assigning a specific Quality of Service (QoS) level to a mobile user of a high data rate transmission system.

2. Description of the Related Art

A communication system is normally required to support a variety of applications. One such communication system is a Code Division Multiple Access (CDMA) system which allows for voice and data communications between end users over a terrestrial link.

The CDMA system is designed to optimize voice communication and many system design parameters are selected to achieve this goal. For example, since time delay between speakers cannot be tolerated, processing delays should be minimized. Each end user is assigned a transmission rate capable of carrying speech data for the duration of a call.

In the CDMA system, end users communicate from mobile stations to base stations located in cells. A user at a mobile station located in a cell communicates with another at a second mobile station or with a standard telephone, by transmitting voice data on the reverse link to a base station. The base station receives the voice data on the reverse link and can route the data to another mobile station via a second base station or to a public switched telephone network. If the second user is at a mobile station, the voice data is transmitted on the forward link of the same base station or of a second base station, to a second mobile station. Otherwise, the voice data is routed through the public switched telephone network to the second user on the standard phone system. In a CDMA system, the forward link and the reverse link are allocated separate frequencies.

The CDMA system is a spread spectrum communication system where communications from a base station to a cell occur on the reverse link, each transmitting mobile station causes interference to other mobile stations in the network and this interference limits the capacity of the reverse link. The reverse link capacity can be increased by transmitting fewer bits which requires less power and reduces interference when the user is not speaking. To minimize interference and maximize the reverse link capacity, the transmit power of each remote station is controlled to maintain the signal that is received at the cell at a constant level and at a specific Quality of Service (QoS) level as determined by the frame error rate.

The user at each mobile station transmits at a different bit rate depending on the level of speech activity in the conversation of that user. A variable rate speech vocoder provides speech data at full rate when the user is actively speaking and at a low rate during period of silence. The amount of speech activity at any given instant is never constant. Therefor, the total power received at the cell from all transmitting mobile stations varies over time. During periods of active speech, the mobile station transmits at a higher power which causes more interference to other mobile stations which, in turn, increases the probability of frame errors in the voice data received by the cell. This further limits the number of users able to gain access to the communication system to minimize the number of transmitted frames that are lost through excessive interference.

Limiting the reverse link capacity to maintain the desired frame error rate and, therefor, the Quality of Service level has the effect of forcing a cell to operate at less than fill capacity. As a result, the reverse link is often under utilized.

Data communication within the CDMA system has different characteristics than voice communication. Data communication is typically characterized by long periods of inactivity, or low activity, interrupted by high bursts of data traffic. An important system requirement for data transmission is the delay required to transfer a burst of data. Transmission delays do not have the same negative impact on data communication as it does for voice communication, but delays are important for measuring the Quality of Service level of the data communication system.

In a CDMA system, since voice communication cannot tolerate extensive delay, priority is given to the transmission of voice data over the transmission of data traffic. The amount of voice activity at any given instant is unpredictable and, therefor, in a CDMA system the transmission of data will be adjusted to prevent the reverse link capacity from being exceeded. In addition, since the mobile station may be in soft handoff between multiple cells, the data transmission rate assigned may be based on the reverse link capacity of each of the base stations involved in the soft handoff.

It is anticipated that the demand for higher transmission rates for data will be greater for the forward link than for the reverse link because a typical mobile user is expected to receive more data than it will generate. The forward link signal is the RF signal transmitted from a base station to one or more mobile stations. The reverse link signal is the RF signal transmitted from the mobile station to a base station. In anticipation of the need for a system to transmit data at higher rates, a High Data Rate (HDR) system is evolving.

In a High Data Rate system, the forward link traffic channel is used for the transmission of an end user's data from a base station to a particular mobile station. During normal operation, the base station generates multiple forward link traffic channels, each of which is used for communication with a particular mobile station. Presently, the average rate of data transmission for an end user varies relative to that of other users and the data for all users is normally transmitted at the same Quality of Service level, or at a level that is selected by the Service Provider.

A High Data Rate system that is used to transmit large bursts of data traffic should be capable of selectively providing different Quality of Service (QoS) levels to different end users. The assignment of different Quality of Service levels to different users will enable Service Providers to offer more flexible services to end users which can then be billed at different rates. At the present time the Standards neither address this problem nor provide any guidance on how a system can be modified to offer an end user his selection of one of a number of Quality of Service levels. Thus, a need exists for a system that will allow a user to select one of a plurality of a desired Quality of Service levels. These issues are addressed by the present invention.

SUMMARY OF THE INVENTION

The present invention is a method for selectively providing, on demand, a Quality of Service level to an end user's data transmitted from a base station to a mobile station of a High Data Rate system. In the disclosed method, a table is established which contains the Quality of Service levels selected by each mobile user from a plurality of levels for data to be transmitted from the base station to a mobile station. Using the reverse link, an end user at a mobile notifies the base station that it is ready to receive data and specifies the rate at which the data is to be sent. Upon receipt of the request for data from the mobile station, the base station runs a scheduler which determines which user's data is to be transmitted next. For each end user, in one embodiment, the scheduler divides the requested data rate by the average rate of data received by the mobile during a specific interval and then combines, by adding or multiplying, the result with the Quality of Service level requested by the end user for data. The end user that has the greatest final result is normally selected to be the next receive data. The scheduler then conditions the base station to transmit data to the identified mobile station at the requested rate and selected Quality of Service level.

BRIEF DESCRIPTION OF THE DRAWINGS

A more complete understanding of the present invention can be obtained by referring to the following detailed description of the preferred embodiment that follows, taken in conjunction with the accompanying drawings, wherein.

DETAILED DESCRIPTION

Figure 1:
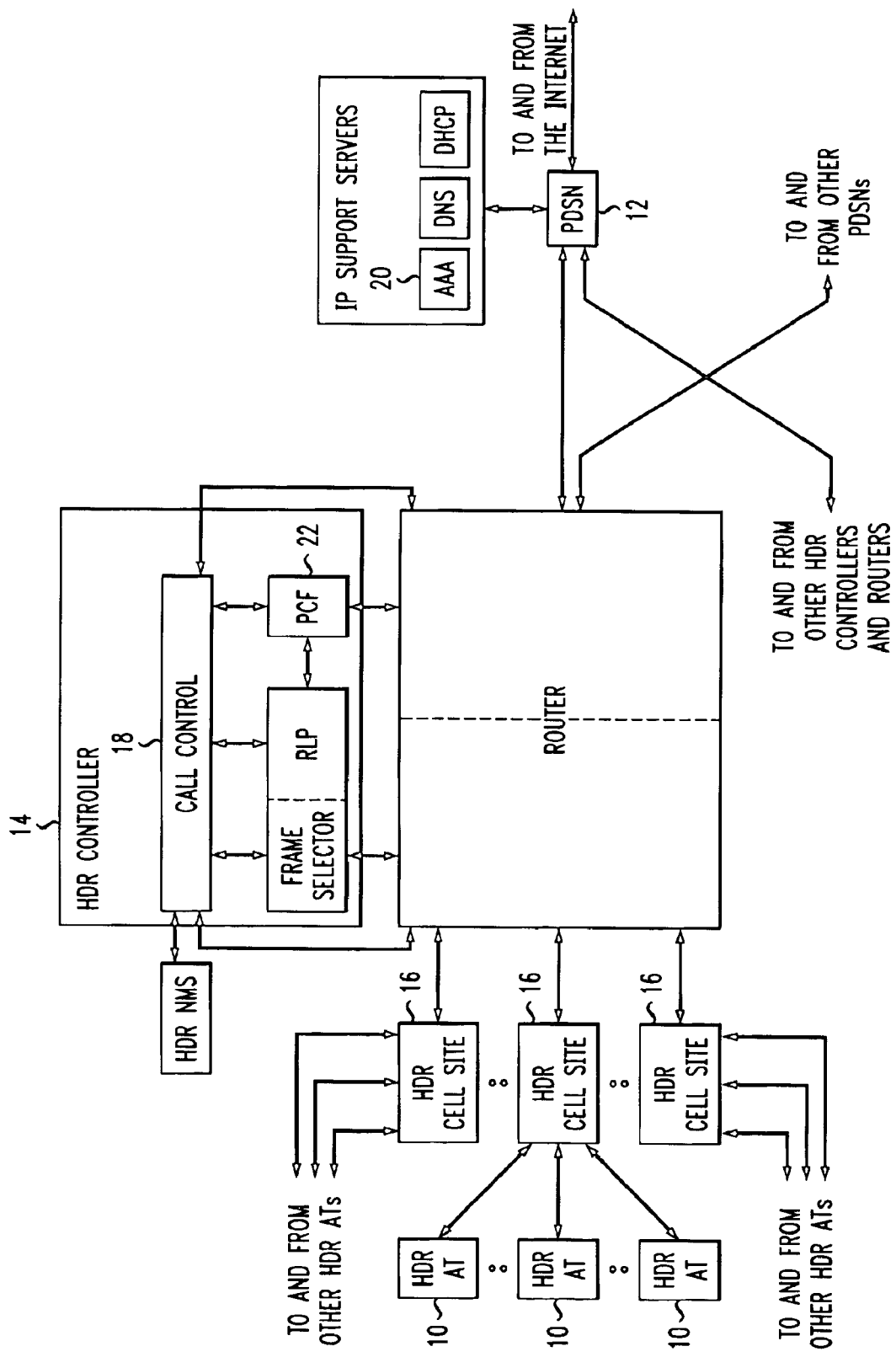
FIG. 1 illustrates a block diagram of a High Data Rate system.

A High Data Rate (HDR) system shares the same spectrum with an IS-95/IS-2000/3G-1X system by using a separate 1.25 MHz frequency dedicated to HDR. The HDR forward link uses a single shared channel always transmitting at full power (except for the power control bits). Users are time-multiplexed on the forward channel (instead of code division access) so as to achieve a higher data throughput for a single user. There is no softer/soft handoff on the forward link, since the mobile station only listens to one forward link at any given time. The transmission data rate on the forward link as well as which sector is the next desired transmitting forward link is determined by the mobile, by some algorithm which takes into account the RF conditions and other factors. Then the mobile indicates the desired rate and serving sector via the Reverse Data Rate Control Channel (DRC). The base station controls and selects which user's data is to be transmitted in the next forward link slot by a scheduling algorithm. Each slot is 1.667 ms, each frame is 26.67 ms. There are 16 slots in each frame. The forward link has four types of channels: The Pilot, Medium Access Control (MAC), Control Channel and Traffic. The MAC is further divided into Reverse Activity and Reverse Power Control channels. The Reverse Link still uses the CDMA scheme. The reverse link has the following types of channels: Access, which is further divided into the Pilot and Data, as well as the Traffic, which is further divided into the Pilot, MAC, ACK and Data. The MAC supports Reverse Rate Indictor (RRI) and Data Rate Control (DRC) channels. The reverse link is power controlled and has softer/soft handoff. When the mobile is assigned a reverse traffic channel, the mobile always transmits the Pilot Channel, the DRC channel and the ACK Channel. The reverse data is transmitted when needed at the rate indicated in the RRI channel. The mobile does not transmit on the reverse traffic channel when it is dormant because there is no traffic channel assigned in dormant.

FIG. 1 illustrates, in block form, a High Data Rate (HDR) system. The system can be made up of the following components: multiple HDR Access Terminals or mobile stations (AT) coupled to a plurality of HDR Cell Sites; a number of HDR Cell Sites connected to an HDR Controller; one or more HDR Controllers connected to Packet Data Service Nodes (PDSN); and PDSNs connected to the rest of the Internet World. These interconnected components specify the behavior of the HDR Controller and how it works with the other components to create a total wireless system that supports a High Data Rate system which can transmit up to a peak rate of 2.4 Mbps on the forward link and 153.6 Kbps on the reverse link.

A mobile station (AT) 10 initiates a session with the PDSN 12 by connecting to the HDR Controller 14. The appropriate HDR cell site 16 processes an incoming connection request and, in turn, requests service from its HDR Controller 14. This initial phase of the call processing is done by the Call Controller 18. Once the Call Controller determines, by going through a number of steps, that the requested traffic connection should be established, it selects a Traffic Processor board (not illustrated) and allocates the appropriate processes on the TP board to make the connection. In addition, it instructs the HDR Cell Site carrier to establish the traffic channel and connect it directly with the created process that will handle the connection. The PDSN is then selected from a list of PDSNs and is then asked, via the PCF to PDSN signaling interface messages, to establish a PCF to PDSN traffic interface connection between the PCF 22 on the selected TP board and itself. The previously allocated process and the PCF on the Traffic Processor board together create an internal data connection to complete the connection between AT and PDSN.

Once the overall connection is established, the end user at the AT can go through the Internet Protocol (IP) logic procedures with the PDSN, which typically involves authenticating the user through the Accounting, Authentication and Authorization (AAA) server 20. Once successfully authenticated, the end user and the PDSN create a Point to Point Protocol session between themselves. This Point to Point Protocol session normally remains until the end user terminates the session.

With the current HDR system, an end user can select or control the transmitted data. By allowing different end uses to select different Quality of Service (QoS) levels, the service providers can offer a more flexible service that can allow them to bill different end users at different rates. The average packet data transmission rates on the forward and reverse traffic channels vary with respect to that of other users and depends on the grade of service that is subscribed for by the end user.

Currently, the various standards for wireless do not provide any suggestion or guidance on how to provide an HDR system which will allow each end user to select a particular Quality of Service (QoS) level for data received.

In the HDR system, the forward link is time division multiplexed. The end user, using the reverse link, sends a request for data from a specific sector to be transmitted to it through the reverse link Data Rate Channel (DRC). When making the request, the end user also specifies the data rate. When the base station discovers that the mobile is requesting the receipt of data from the base station, the base station tries to honor the request by running a scheduler which runs a scheduling algorithm. The scheduling algorithm determines an average data rate from the number of users and the requested data rate from each user, and them makes a decision as to which user's data is to be transmitted next. In one scheduling algorithm, the scheduler sends data to the end user that has the highest data request rate relative to the average rate.

The present invention discloses a method of enabling an end user to select one of a plurality of Quality of Service (QoS) levels for data transmitted to an end user. With the method here disclosed, a table is established which identifies the QoS level selected by each end user for data that is to be transmitted from a base station to the mobile station. When a new transmission is to begin, the scheduler runs an algorithm for each end user which has sent a request to the base station for the receipt of data at a specific rate. In one embodiment, the algorithm divides the rate requested by the end user for data in a specific slot by the average rate received by that end user during a period which can extend from 30 seconds up to or greater than 10 minutes. This result is then combined, by either addition or multiplication, with the Quality of Service level obtained from the table for that end user to obtain a sum. The end user that has the highest sum is normally selected by the scheduler to be the end user that next receives data. Upon determining the end user that is next to receive data, the scheduler conditions the base station to transmit the selected end user's data at the Quality of Service level specified in the table and at the rate requested by the end user or at the nearest supportable rate to the mobile station of the end user.

In the operation of a wireless system, particularly in a high data rate wireless system, a scheduler can be used to selectively assign the use of the systems resources. For example, a scheduler can be used to designate which ones of the various mobile stations being serviced from a common base station will be selected to receive data from the base station. Additionally, the types of schedulers and the algorithms run by the schedulers available for use in a high data rate system can vary from a scheduler that is designed to transmit total throughput to a single user to a scheduler that is committed to treating all mobile stations equally. Depending upon the requirements of the high data rate system, a scheduler having operating characteristics that fall between these two extremes can also be used. It is to be understood that the invention here disclosed, that of allowing an end user to select a desired Quality of Service level for transmitted data, is not limited to a specific algorithm run by the scheduler.

What is here disclosed is a scheduler which runs a specific algorithm to identify which mobile station is to be the next to receive data and, to that information the Quality of Service level for that end user is added. Thus, while a specific algorithm is disclosed for use with the Quality of Service level designated for a specific end user, it is to be understood that this invention is not limited to a specific algorithm which is used to identify the next end user which is to receive data from a base station.

The previous description of the preferred embodiment is provided to enable any person skilled in the art to make or use the present invention. Various modifications to this embodiment will be readily apparent to those skilled in the art, and the generic principles defined herein may be applied to other embodiments without the use of the inventive faculty. Thus, the present invention is not intended to be limited to the embodiment shown herein but is to be accorded the widest scope consistent with the principles and novel features disclosed herein.

The invention claimed is:

1. A method of scheduling a quality of service level to an end user's data transmitted from a base station comprising the steps of:

establishing a table of the quality of service levels designated by each end user, receiving at the base station requests from at least two end users for data at selected rates, for each end user, determining the average data rate received by an end user during a fixed interval of time, dividing an indicated rate by the average rate to obtain a result, combining the result with the quality of service level designated by the user to obtain a sum, and using the sum to select an end user to receive data.

2. The method of claim 1 further comprising the step of selecting the end user that has the highest sum as the receiver data.

3. The method of claim 1 further comprising the step of obtaining a sum for each end user each time there is a new transmission.

4. The method of claim 1 further comprising the step of maintaining the end user selected as the receiver of data for a designated period to the exclusion of other end users.

5. The method of claim 1 further comprising the step of selecting each end user to receive data in unequal increments.

6. The method of claim 1 further comprising the step of selecting each end user to receive data in equal increments.

7. The method of claim 1 comprising the step of providing at least two quality of service levels from which each end user can select.

8. The method of claim 1 wherein the step of determining the average data rate received by an end user is over a period of time that is less than 10 minutes.

9. The method of claim 1 wherein the step of determining the average data rate received by an end user is over a period of time that is greater than 9 minutes.

10. The method of claim 1 wherein the step of determining the average data rate received by an end user is over an active period which is greater than 30 seconds and less than 3½ minutes.

11. A method of scheduling a quality of service level to an end user's data transmitted from a base station comprising the steps of establishing a quality of service level for each end user, obtaining for each end user a result based on the average data rate for data previously sent to that end user during a specified interval of time, and combining, for each end user, the result with the quality of service level for each end user to obtain a sum, using the sum to determine the next end user to receive data.

12. The method of claim 11 wherein the result is based on the amount of data previously sent to that end user during a specific interval of time.

13. The method of claim 12 further comprising the step of including a data rate requested by the end user to obtain the result.

14. The method of claim 12 further comprising the steps of dividing the amount of data sent to an end user during a specific interval of time by that interval of time to obtain an average rate of data transmission, and including the average rate of data transmission to obtain the result.

15. The method of claim 14 further comprising the step of obtaining from the base station the data rate for transmitted data requested by an end user, and dividing the data rate requested by the end user by average rate of data transmission to obtain a result.

16. The method of claim 15 wherein the interval of time is greater than 30 seconds.

17. The method of claim 15 wherein the interval of time is less than 10 minutes.

18. The method of claim 15 further comprising the step of conditioning the base station to send data to the end user determined to be the next end user at the requested data rate and requested quality of service level.

19. A method of scheduling a quality of service level to an end user's data transmitted from a base station comprising the steps of:

establishing a quality of service level for each end user;

dividing the amount of data sent to the end user during a specific interval of time by that interval of time to obtain an average rate of data transmission;

obtaining for each end user a result based on the amount of data previously sent to that end user and the average rate of data transmission during the specified interval of time;

combining, for each end user, the result with the quality of service level for each end user to obtain a sum;

using the sum to determine the next end user to receive data;

obtaining from the base station the data rate for transmitted data requested by an end user; and dividing the data rate requested by the end user by average rate of data transmission to obtain a result.

20. The method of claim 19 wherein the interval of time is greater than 30 seconds.

21. The method of claim 19 wherein the interval of time is less than 10 minutes.

22. The method of claim 19 further comprising the step of conditioning the base station to send data to the end user determined to be the next end user at the requested data rate and requested quality of service level.

* * * * *